(12) United States Patent
Brainard et al.

(10) Patent No.: US 7,502,467 B2
(45) Date of Patent: *Mar. 10, 2009

(54) SYSTEM AND METHOD FOR AUTHENTICATION SEED DISTRIBUTION

(75) Inventors: John G. Brainard, Sudbury, MA (US); Burton S. Kaliski, Jr., Wellesley, MA (US); Magnus Nyström, Concord, MA (US); Ronald L. Rivest, Arlington, MA (US)

(73) Assignee: RSA Security Inc., Bedford, MA (US)

( * ) Notice: Subject to any disclaimer, the term of this patent is extended or adjusted under 35 U.S.C. 154(b) by 195 days.

This patent is subject to a terminal disclaimer.

(21) Appl. No.: 11/265,510

(22) Filed: Nov. 2, 2005

(65) Prior Publication Data

US 2006/0256961 A1 Nov. 16, 2006

Related U.S. Application Data (63) Continuation of application No. 09/304,775, filed on May 4, 1999, now Pat. No. 6,985,583.

(51) Int. Cl.
 *H04L 9/00* (2006.01)
 *H04L 9/32* (2006.01)
(52) U.S. Cl. .................. 380/44; 380/277; 713/150; 713/168; 726/5
(58) Field of Classification Search ............... 380/44
 See application file for complete search history.

(56) References Cited

U.S. PATENT DOCUMENTS 4,104,694 A 8/1978 Hargrove (Continued)

FOREIGN PATENT DOCUMENTS

EP 0140013 5/1985

(Continued)

OTHER PUBLICATIONS

American National Standard for Financial Services. "Financial Services Key Management Using the DEA," American Bankers Association, copyright 1992, 1999, pp. i-iii, 1-9, 34-52. cited by other.

(Continued)

*Primary Examiner*—Kambiz Zand
*Assistant Examiner*—Ronald Baum
(74) *Attorney, Agent, or Firm*—BainwoodHuang (57) ABSTRACT

In one embodiment of a user authentication system and method according to the invention, a device shares a secret, referred to as a master seed, with a server. The device and the server both derive one or more secrets, referred to as verifier seeds, from the master seed, using a key derivation function. The server shares a verifier seed with one or more verifiers. The device, or an entity using the device, can authenticate with one of the verifiers using the appropriate verifier seed. In this way, the device and the verifier can share a secret, the verifier seed for that verifier, without that verifier knowing the master seed, or any other verifier seeds. Thus, the device need only store the one master seed, have access to the information necessary to correctly derive the appropriate seed, and have seed derivation capability. A verifier cannot compromise the master seed, because the verifier does not have access to the master seed.

42 Claims, 5 Drawing Sheets

U.S. PATENT DOCUMENTS

| | | | |
|---|---|---|---|
| 4,145,568 A | 3/1979 | Ehrat et al. | |
| 4,145,569 A | 3/1979 | Ehrat et al. | |
| 4,238,854 A | 12/1980 | Ehrsam et al. | |
| 4,317,957 A | 3/1982 | Sendrow | |
| 4,320,387 A | 3/1982 | Powell | |
| 4,369,332 A | 1/1983 | Campbell, Jr. | |
| 4,438,824 A | 3/1984 | Mueller-Schloer | |
| 4,471,216 A | 9/1984 | Herve et al. | |
| 4,509,093 A | 4/1985 | Stellberger et al. | |
| 4,536,647 A | 8/1985 | Atalla et al. | |
| 4,543,657 A | 9/1985 | Wilkinson et al. | |
| 4,575,621 A | 3/1986 | Dreifus | |
| 4,578,530 A | 3/1986 | Zeidler | |
| 4,582,434 A | 4/1986 | Plangger et al. | |
| 4,599,489 A | 7/1986 | Cargile | |
| 4,605,820 A | 8/1986 | Campbell, Jr. | |
| 4,609,777 A | 9/1986 | Cargile | |
| 4,614,861 A | 9/1986 | Pavlov et al. | |
| 4,720,860 A | 1/1988 | Weiss | |
| 4,731,841 A | 3/1988 | Rosen et al. | |
| 4,800,590 A | 1/1989 | Vaughan | |
| 4,819,267 A | 4/1989 | Cargile et al. | |
| 4,849,613 A | 7/1989 | Eisele et al. | |
| 4,856,062 A | 8/1989 | Weiss | |
| 4,885,778 A | 12/1989 | Weiss | |
| 4,890,323 A | 12/1989 | Beker et al. | |
| 4,928,098 A | 5/1990 | Dannhaeuser et al. | |
| 4,933,971 A | 6/1990 | Bestock et al. | |
| 4,944,008 A | 7/1990 | Piosenka et al. | |
| 4,998,279 A | 3/1991 | Weiss | |
| 5,016,276 A | 5/1991 | Matumoto et al. | |
| 5,023,908 A | 6/1991 | Weiss | |
| 5,046,125 A | 9/1991 | Takizawa et al. | |
| 5,058,161 A | 10/1991 | Weiss | |
| 5,097,505 A | 3/1992 | Weiss | |
| 5,101,430 A | 3/1992 | Periou et al. | |
| 5,168,520 A | 12/1992 | Weiss | |
| 5,180,902 A | 1/1993 | Schick et al. | |
| 5,206,905 A | 4/1993 | Lee et al. | |
| 5,237,614 A | 8/1993 | Weiss | |
| 5,280,527 A | 1/1994 | Gullman et al. | |
| 5,347,580 A | 9/1994 | Molva et al. | |
| 5,361,062 A | 11/1994 | Weiss et al. | |
| 5,367,572 A | 11/1994 | Weiss | |
| 5,479,512 A | 12/1995 | Weiss | |
| 5,485,519 A | 1/1996 | Weiss | |
| 5,513,263 A | 4/1996 | White et al. | |
| 5,539,824 A | 7/1996 | Bjorklund et al. | |
| 5,592,553 A | 1/1997 | Guski et al. | |
| 5,655,077 A | 8/1997 | Jones et al. | |
| 5,657,388 A | 8/1997 | Weiss | |
| 5,717,756 A | 2/1998 | Coleman | |
| 5,732,133 A | 3/1998 | Mark | |
| 5,734,720 A * | 3/1998 | Salganicoff | 380/211 |
| 5,737,421 A | 4/1998 | Audebert et al. | |
| 5,748,734 A | 5/1998 | Mizikovsky | |
| 5,779,545 A * | 7/1998 | Berg et al. | 463/22 |
| 5,802,176 A | 9/1998 | Audebert et al. | |
| 5,841,864 A | 11/1998 | Klayman et al. | |
| 5,887,065 A | 3/1999 | Audebert | |
| 5,937,068 A | 8/1999 | Audebert | |
| 6,078,888 A | 6/2000 | Johnson, Jr. | |
| 6,141,760 A | 10/2000 | Abadi et al. | |
| 6,266,413 B1 * | 7/2001 | Shefi | 380/46 |
| 6,295,359 B1 | 9/2001 | Cordery et al. | |
| 6,307,938 B1 * | 10/2001 | Matyas et al. | 380/44 |
| 6,338,140 B1 | 1/2002 | Owens et al. | |
| 6,345,098 B1 * | 2/2002 | Matyas et al. | 380/46 |
| 6,915,434 B1 * | 7/2005 | Kuroda et al. | 713/193 |
| 6,985,583 B1 | 1/2006 | Brainard et al. | |

FOREIGN PATENT DOCUMENTS

| | | |
|---|---|---|
| EP | 0148960 | 7/1985 |
| EP | 0566811 | 10/1993 |
| EP | 0678836 | 10/1995 |
| FR | 2607544 | 6/1988 |
| JP | 59119630 | 7/1984 |
| JP | 2835433 | 12/1998 |
| JP | 2884338 | 4/1999 |
| WO | WO-8806826 | 9/1988 |

OTHER PUBLICATIONS

Chevassut, O., et al. "One-time Verifier based Encrypted Key Exchange", Lawrence Berkeley National Lab., Springer-Verlag 2004-2005, entire document. cited by examiner.

European Patent Office, European Search Report, International Application EP 00 30 3741, date of completion of search Jan. 16, 2002, 2 pages. cited by other.

Ferreira, "The Smart Card: A High Security Tool in EDP", Philips Telecommunications and Data Systems Review, Philips Telecommunicatie Industrie N.V. Hilversum, NL, Sep. 1989, vol. 47, No. 3, pp. 1-19. cited by other.

FIPS Publ. 190, "Guideline for the use of advanced authentication technology alternatives", Sep. 28, 1994, section 4; section 4.4.2.1 particularly cited by examiner.

Freier, et al. The SSL Protocol, Version 3.0, http://home.netscape.com/eng/ssl3/3-SPEC.htm, Mar. 1996, pp. 1-26, and Table of Contents, http://home.netscape.com/eng/ssl3/ssl-toc.html, pp. 1-3. cited by other.

Kim, Y., et al, "Secure authentication system that generates seed from biometric information", Feb. 10, 2005, Optical Society of America, Applied Optics, vol. 44, No. 5, entire article. cited by examiner.

RSA Laboratories, a division of RSA Data Security, Inc. "PKCS #5 v2.0: Password-Based Cryptography Standard." Mar. 25, 1999, copyright 1991-1999, pp. 1-30. cited by other.

Shamir, "Identity-Based Cryptosystems and Signature Schemes", Lecture Notes in Computer Science, Springer Verlag, New York, NY, US, 1985, pp. 47-53. cited by other.

Standard Specifications for Public Key Cryptography, IEEE P 1363/ D 13 (Draft Version 13), Institute of Electrical and Electronics Engineers, Inc., New York, NY, Nov. 12, 1999, pp. 1, 4-6, 53-57, 71-73. cited by other.

* cited by examiner

SYSTEM AND METHOD FOR AUTHENTICATION SEED DISTRIBUTION

TECHNICAL FIELD

This invention relates to the field of computer-based security systems and, more particularly, to the distribution of authentication seeds.

BACKGROUND INFORMATION

In security systems, verifiers are used to authenticate, that is to verify the identity of, a person or other entity such as a computer. When an entity has been authenticated, meaning that the identity of the entity has been determined by the verifier, the entity is allowed access, for example physical access to a physical location, in the case of a physical security system, or electronic access to information (e.g. financial records, computer data, network access, etc.), in data security systems.

There are many possible configurations for verifiers. Verifiers can receive input from keypads, keyboards, card readers, cameras, microphones, telephone and computer networks, and other such data input devices. As output, verifiers activate physical mechanisms, send electronic data signals, configure software, or take such other action to provide access. Verifiers can be implemented in various ways, for example as special purpose electronic and/or mechanical systems, or as general purpose computers, possibly, but not necessarily, in electrical communication with special-purpose hardware.

Some verifiers use knowledge of a shared secret to authenticate an entity. For example, knowledge of a personal identification number, password, or passphrase can be used to verify an entity. At the time that authentication takes place, the entity either reveals the secret or otherwise proves knowledge of the secret. If the entity shows knowledge of the secret, the entity is authenticated.

In some systems, an entity uses a physical or digital device, referred to as a token, that incorporates a secret. The secret, stored in some manner in the device, may or may not be known to the entity using the device. A common door key is one simple mechanical example of such a device. The shape of the key is a shared secret. When a key is inserted into a lock, the lock verifies that the key is of the correct shape. The door key shows knowledge of the secret to the verifier (the lock), and allows entry. An attacker who learns the exact shape of the key can generate an appropriate token and authenticate to the lock.

A bank card is a device that can contain a secret identification number that is revealed when the card is accessed by an automatic teller machine ("ATM"). Some bank cards incorporate cryptography to make forging of bank cards more difficult. Also, to provide an added layer of security, automatic teller machines require the user to possess the device (bank card) containing secret information, and require the user to enter a Personal Identification Number ("PIN"), which is another secret shared between the bank's verifier and the account holder.

Some devices, to prove knowledge of a secret contained within the device, provide an authentication code that is based upon, but different from, the secret code contained within the device. The use of such an authentication code allows the device to show knowledge of a secret without revealing it. In some systems, the authentication code is based on time-dependent information. The use of this sort of device has security benefits in that the secret is more difficult to determine by eavesdropping in the communications channel between the entity and the verifier, since the secret itself is not revealed.

One example of this sort of device used by a person to authenticate to a verifier is a token that includes an authentication code display. The person reads an authentication code from the display, and transmits the authentication code to the verifier. In such a system, the user may never know the shared secret. Some such tokens accept user input, such as a PIN, and provide a result in response to the user input as well as other information (such as time-dependent information).

One token of this type stores a secret code, referred to as a seed, and mathematically combines the secret code with a time-varying value and a personal identification code provided by the user to generate an authentication code. The mathematical combination takes place in such a way that the secret code stored in the token cannot be determined from the result—the secret code is combined cryptographically with the current time and other information. In another system that is a challenge-response system, meaning that the verifier transmits a challenge for the user to respond to, the secret code is cryptographically combined with the challenge to produce an output that is sent to the verifier as a response to the challenge.

To verify an entity using a shared secret, the verifier needs to have knowledge of the shared secret. In a security system that verifies a large number of entities, there is a tradeoff between security and verifier availability. If there are a large number of verifiers, there is more likely to be a verifier available when a particular entity requires authentication. However, as the number of verifiers that have knowledge of a secret increases, it is increasingly more difficult to maintain the secrecy of the secret. For example, as the number of verifiers increases, so does the chance that one of the verifiers can be compromised in some fashion. Yet, if the number of verifiers is limited, it possible that a verifier will not be available to authenticate an entity when the entity requires authentication.

In addition, a single device presently cannot be used to access multiple independent services. For example, the same device cannot be used to access an enterprise's computer system and a financial institution's web page. Even if each independent service trusts the user and the device, the services do not trust each other. In the example just mentioned, a bank does not trust the user's employer. If each of the services share the same secret with the device, then each service has information that can compromise the others. This prevents use of a single device from being used with verifiers associated with independent services.

The utility of a security system is limited by the number and variety of verifiers to which an entity can conveniently authenticate. If the entity interacts with a number of verifiers that share different secrets with that entity, the entity will have to manage a number of secrets (or devices containing secrets), where each secret is used to authenticate to one or small number of verifiers. Managing a large number of secrets adds complexity to a computer-based entity, and is inconvenient for a human entity. Even the process of securely sharing a different secret between an entity and each of a large number of verifiers can be inconvenient and cumbersome.

Similar issues arise in the area of secure communications, where a single shared secret is used as an encryption key. To communicate securely with many other entities, an entity either has to have a separate shared secret with each other entity, or has to share the same secret with more than one entity, thereby reducing the secrecy (and security) of the shared secret.

Public key cryptography can be used to avoid the need to securely share a secret between each two parties that wish to communicate or authenticate. However, public-key cryptography is impractical in many user and device authentication settings, at least partly because of the large computation power required to accomplish the calculations, and the complexity of managing certificates and revocation lists.

SUMMARY OF THE INVENTION

The system and method of the present invention allows an entity to authenticate to many verifiers without having to manage a large number of secrets. An authentication system that is simple, and that allows the user to manage just one secret, yet allows the user to authenticate with multiple verifiers is a great improvement over the prior art. For example, a token-based system and method could allow authentication with some or all of such diverse systems as (but not limited to) file servers inside and outside of one or more enterprises, remote access servers, web servers associated with various services (e.g. financial, business, utilities, entertainment, etc.), other computers, a physical security system within a home or office, and a bank automatic teller machine. Such an authentication method and system avoids the complexity and cost of managing different secrets or devices for different services.

The benefit of associating a single secret with a user that is useful with multiple verifiers is beneficial even if the device is an electronic wallet stored on a personal computer, where the memory and processing limitations are much less restrictive than in a smart card or other small-sized token with limited memory and processing power. The simplicity allows for smaller, faster implementations, and also avoids the complexity of sharing each secret.

In an embodiment of a user authentication method and system according to the invention, a device shares a secret, referred to as a master seed, with a server. The device and the server both derive one or more secrets, referred to as verifier seeds, from the master seed, using a key derivation function. The server shares a verifier seed with one or more verifiers. The device, or an entity using the device, can authenticate with one of the verifiers using the appropriate verifier seed. In this way, the device and the verifier can share a secret, the verifier seed, without that verifier having access to the master seed, or any other verifier seeds. Thus, the device need only store the one master seed, have access to the information necessary to correctly derive the appropriate verifier seed, and have seed derivation capability. An individual verifier cannot compromise the master seed, because the verifier does not have access to the master seed. In addition, if a particular verifier is compromised, only that verifier seed is affected, and other verifiers using other verifier seeds are not compromised.

In one aspect of the invention, a method for distributing authentication information associated with a device includes generating a master seed associated with the device, deriving a verifier seed using the master seed and information associated with a verifier, and transmitting the verifier seed to the verifier. In one embodiment, the method includes, after the generating step, the step of transmitting the master seed to the device. In another embodiment, the method includes, after the generating step, sharing the master seed with the device and a server. In another embodiment, the method includes, after the transmitting step, deriving a second verifier seed using the master seed and information associated with a second verifier, and transmitting the second verifier seed to the second verifier. In another embodiment, the method includes, after the transmitting step, generating an authentication code in response to the verifier seed.

In one embodiment, the generating step includes generating an authentication code in response to the verifier seed and a time dependent value. In another embodiment, the method includes the step of authenticating using the authentication code. In another embodiment, the authenticating step includes authenticating a user or a device by verifying the authentication code. In another embodiment, the authenticating step includes transmitting the authentication code to the verifier. In another embodiment, the generating step includes randomly generating and/or pseudorandomly generating the master seed.

In one embodiment, the deriving step includes deriving the verifier seed in response to a time identifier. In another embodiment, the deriving step includes deriving a verifier seed by using the master seed and information associated with a verifier as inputs to a key derivation function. In another embodiment, the key derivation function is a hash function.

In another aspect of the invention, a system for distributing authentication information associated with a device includes a seed generator for generating a master seed associated with a device, a server for deriving a verifier seed using the master seed and information associated with a verifier, and a transmitter for transmitting the verifier seed to the verifier. In one embodiment, the system includes a transmitter for transmitting the master seed to the device. In another embodiment, the system includes a communication channel for sharing the master seed with the device and the server. In another embodiment, the server derives a second verifier seed using the master seed and information associated with a second verifier, and the transmitter transmits the second verifier seed to the second verifier. In another embodiment, the system includes an authentication code generator for generating an authentication code in response to the verifier seed. In another embodiment, the system includes an authentication code generator for generating an authentication code in response to the verifier seed and a time dependent value. In another embodiment, the seed generator is a random generator and/or a pseudorandom generator. In another embodiment, the server includes a key derivation function.

In another aspect of the invention, a method for authentication includes storing a master seed associated with a device, deriving a verifier seed using the master seed and information associated with a verifier, and generating an authentication code in response to the verifier seed. In one embodiment, the method includes authenticating a user with the authentication code. In another embodiment, the method includes transmitting the authentication code to a verifier. In another embodiment, the method includes receiving the authentication code by a verifier.

In another aspect of the invention, an authentication system includes a memory for storing a master seed associated with a device, a server for deriving a verifier seed using the master seed and information associated with a verifier, and an authentication code generator for generating an authentication code in response to the verifier seed.

In another aspect of the invention, a verifier includes a data store for storing a verifier seed associated with a device, an input for receiving an input authentication code, and an authenticator for determining whether the input authentication code was correctly generated in response to the verifier seed.

In another aspect of the invention, a token includes a data store for storing a master seed, a key derivation function for deriving a verifier seed from a master seed in response to information associated with a verifier, an authentication code generator for generating an authentication code in response to a verifier seed, and an output for providing the authentication code to a verifier.

In another aspect of the invention, an authentication method includes generating a master seed, sharing the master seed between a token and a server, deriving a verifier seed from the master seed using a key derivation function, and transmitting an authentication code responsive to the verifier seed.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
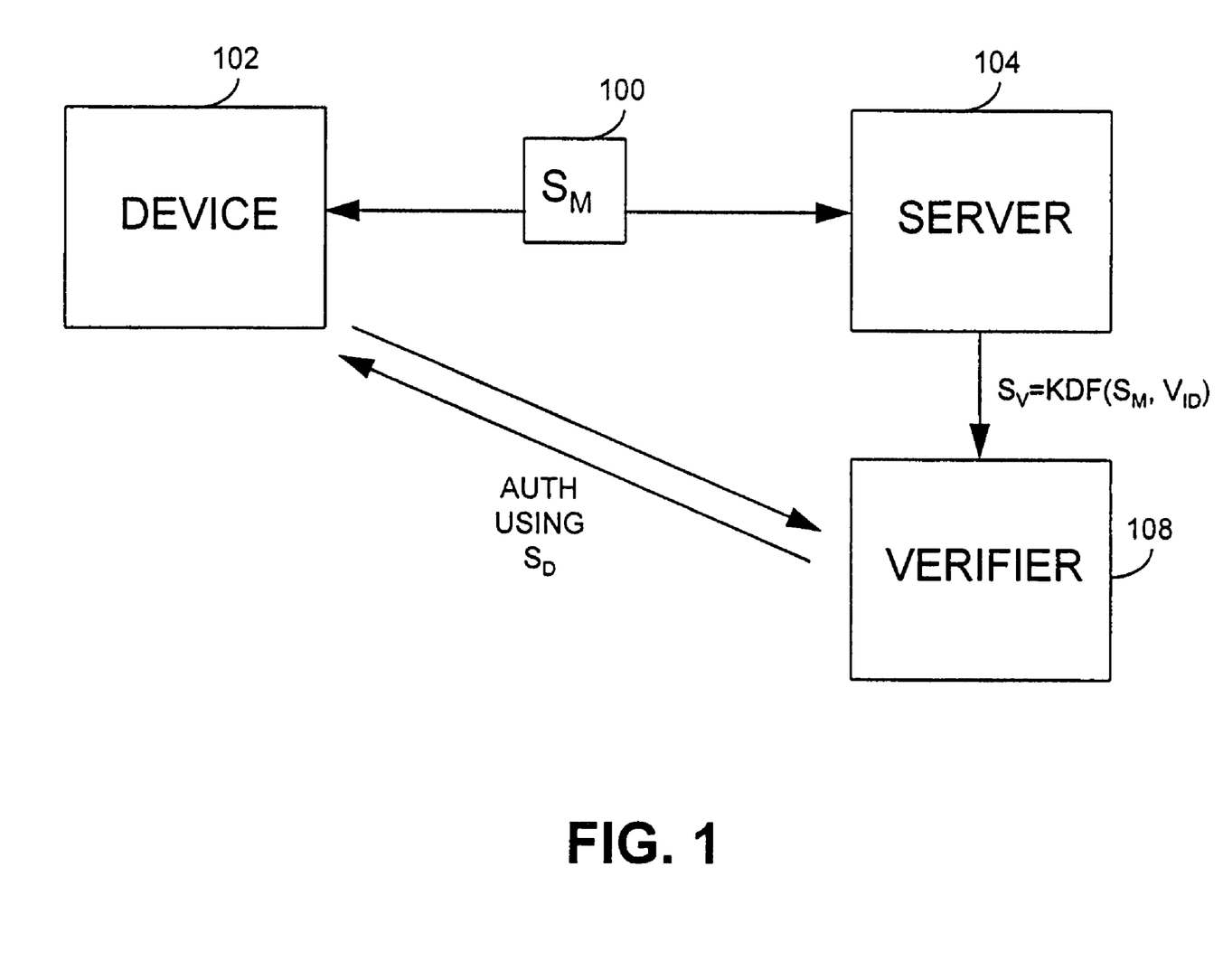
FIG. 1 is a block diagram of an embodiment of a system according to the invention.

Referring to FIG. 1, in one embodiment, a master seed $S_M$ 100 is generated for a device 102. The master seed $S_M$ 100 is a secret that is shared by the device 102 and the server 104. In one embodiment, the server 104 may be exclusively a seed distribution server, and in other embodiments, the server 104 is a data server, such as a file server, web server, or authentication server, that incorporates seed distribution functionality. In one embodiment, the master seed 100 is generated randomly, for example by using a sensor observing a sufficiently random physical event. In another embodiment, the master seed $S_M$ 100 is generated by a pseudorandom number generator. In other embodiments the master seed $S_M$ 100 is generated in other ways that produce a secret number that is statistically difficult to predict.

The master seed $S_M$ 100 is, in various embodiments, generated by the device 102, the server 104, or by another entity used for seed generation. The master seed $S_M$ 100 is shared by the device 102 and the server 104, preferably in a private manner, for example over a secure communications link. In one embodiment, the device 102 generates the master seed $S_M$ 100 and shares it with the server 104. In another embodiment, the server 104 generates the master seed $S_M$ 100 and shares it with the device 102. In yet another embodiment, another entity, a seed generator (not shown in FIG. 1), generates the master seed $S_M$ 100, and communicates it to either the device 102 or the server 104 for sharing with the other. In still another embodiment, the seed generator communicates the master seed $S_M$ 100 directly to both the device 102 and the server 104.

The server 104 generates a verifier seed $S_V$ associated with a verifier 108. The server 104 generates the verifier seed $S_V$ by using a key derivation function "KDF." Key derivation functions are well known in the field of encryption relating to user-provided passwords. User-provided passwords are generally not directly useful as an encryption key in conventional cryptosystems. Systems that use passwords as a basis for encryption generally derive an encryption key from the password using a key derivation function. Key derivation functions are generally chosen for a capability to generate relatively distinct outputs for different inputs, and because they are hard to reverse, meaning that it is difficult, given a particular output, to determine the input. Various key derivation functions are based on hash functions, pseudorandom functions, and so on.

Key derivation functions typically combine the password with other information, referred to as a salt. The salt need not be a secret value. An iterative function also may be included in a key derivation function. A number, referred to as an iteration count, can be used to indicate how many times to perform an underlying function by which the key is derived. The incorporation of the iteration count into the key derivation function increases the effort required to derive an encryption key from a password. A modest number of iterations, for example 1000, is not likely to be a burden for legitimate parties when computing a key, but it will be a significant burden for attackers. If the password value is a large random value, a small iteration count may be used.

In one embodiment, a key derivation function called PBKDF2 is used to implement the invention. PBKDF2 uses the message authentication code HMAC-SHA-1, which is a message authentication code based on the SHA-1 hash function. HMAC-SHA-1 takes two arguments as input. The first argument is an encryption key, and the second argument is text that is encrypted by the encryption key. HMAC-SHA-1 has a variable encryption key length and produces a 20-octet (160-bit) output value. When PBKDF2 uses the underlying function HMAC-SHA-1, it provides two inputs to HMAC-SHA-1, and HMAC-SHA-1 provides a 160-bit output in response.

The key derivation function PBKDF2 has as inputs a password (P), a salt (S), an iteration count (c), and a length (Len) in octets (8-bit bytes). PBKDF2 computes each block of derived output independently by applying the underlying function (HMAC-SHA-1) for (c) iterations. A block is the number of bits produced as output by the underlying function, which is 160 bits for HMAC-SHA-1. On the first iteration, the password (P) is the first argument to the underlying function, and the salt (S) concatenated with the block number is the second argument to the underlying function. The underlying function encrypts the salt concatenated with the block number using the password as the encryption key. In subsequent iterations, the result of the previous iteration is passed as the second argument to the underlying function, with the password again used as the encryption key. The results of all the iterations are combined, using the exclusive-or operation to produce the final result.

In more formal notation, the PBKDF2 key derivation function can be described as:

$$PBKDF2(P,S,c,i)=U_1 \text{ \xor } U_2 \text{\xor} \ldots \text{\xor } U_c$$

where $$U_1=PRF(P,S\|INT(i)),$$

$$U_2=PRF(P,U_1),$$

$$\ldots$$

$$U_c=PRF(P,U_{c-1}).$$

Here, INT (i) is a four-octet encoding of the block number i, most significant octet first, and PRF is the underlying function. In the embodiment just described, PRF is HMAC-SHA-1. It should be clear that other key derivation functions would be similarly useful, and various substitutions for the verifier information and other information are possible, as required by the particular key derivation function. Key derivation functions based on underlying hash functions, block ciphers, message authentication codes, and so on are intended to be within the scope of the invention.

In one embodiment, the key derivation function PBKDF2 is used to derive a verifier seed from a master seed by using the master seed as the password P, and the concatenation of a verifier identifier and a time identifier as the salt S. The inputs to the key derivation function are thus the master seed, and the concatenated verifier identifier and time identifier. Of course, either the verifier identifier and/or the time identifier might not be included, and instead a default value used. Because this information substitutes for the salt, the verifier identifier and the time identifier do not have to be secret, and can be public information. As further described below, the verifier identifier $V_{ID}$ includes information about the verifier, and also can include other information, such as a time value.

In one embodiment, the key derivation function KDF takes as inputs the master seed $S_M$ 100 and identifying information $V_{ID}$ about the verifier 108. The device 102, also stores the master seed 100, and has access to the verifier identifier information $V_{ID}$. The device 102 is therefore able to use the same key derivation function KDF to obtain the same verifier seed $S_V$ from the master seed $S_M$ 100 and the verifier identifier information $V_{ID}$.

To authenticate with the verifier 108, the device 102 uses the verifier seed $S_V$ that is shared by the device 102 and the verifier 108. In one embodiment, the authentication is accomplished by the device 102 transmitting the verifier seed $S_V$ directly to the verifier 108. In another embodiment, the authentication is accomplished by the device 102 transmitting a value mathematically derived from the verifier seed $S_V$ to the verifier 108. The device 102 mathematically derives a value from the verifier seed $S_V$, and transmits the derived value from the verifier 108. The derivation, in various embodiments, is accomplished using a hash function, block cipher, message authentication code, or other techniques. In one embodiment, the verifier seed $S_V$ is, as part of the derivation, combined with other information, such as time-dependent information. For example, in one embodiment, the device 102 transmits a hash of the verifier seed $S_V$. In another embodiment, the device 102 transmits a derived time-dependent value encrypted using the verifier seed $S_V$ as the encryption key. Other authentication and communication systems and methods that can be utilized when a secret is shared by a device 102 and a verifier 108 can be extended to use the verifier seed. For example, U.S. Pat. Nos. 4,720,860, 4,885, 778, 4,856,062, 4,998,279, 5,023,908, 5,058,161, 5,097,505, 5,237,614, 5,367,572, 5,361,062, 5,485,519, and 5,657,388 describe various systems and methods for authentication using shared secrets. Such systems can incorporate the system and method of the invention to use a verifier seed as the basis for authentication. As another example, a challenge/response system includes the verifier 108 transmitting a challenge value to the device 102, and the device 102 encrypting the challenge value with the verifier seed $S_V$, and transmitting the result back to the verifier. In one embodiment, the device 102 displays or otherwise communicates the authentication information to a user, who in turn communicates the authentication information to the verifier.

In one embodiment, the verifier seed $S_V$ is specific to a particular verifier 108. In other embodiments, the verifier seed $S_V$ is associated with, and shared by, more than one verifier 108. The verifier identifier information $V_{ID}$ in such an embodiment identifies the group of verifiers, rather than a specific identifier 108. The entity or device 102 may or may not know that there is more than one verifier 108 associated with a particular verifier identifier 108.

In another embodiment, the verifier seed $S_V$ is specific to a specific time or time period, such as a second, minute, hour, day, week, month, or year, or a fraction, plurality, or combination thereof. In one such embodiment, the time or time period is represented by a time identifier describing the particular day in a particular format, such as the year, month, and day in YYYYMMDD format. In another such embodiment, the day is described as the day beginning with the specific number of seconds since a predetermined date. In one embodiment, that date is Jan. 1, 1970. In these embodiments, the verifier identifier information $V_{ID}$ includes the time identifier information.

In another embodiment, the verifier seed $S_V$ is specific both to a specific time or time period, and to a specific verifier or group of verifiers. In one such embodiment, the time or time period is represented by a time identifier $T_{ID}$, and the verifier or group of verifiers are represented by a verifier identifier $V_{ID}$. In one such embodiment, the time identifier information $T_{ID}$ and the verifier identifier information $V_{ID}$ are separate inputs to the key derivation function KDF. In another embodiment, the time identifier information $T_{ID}$ and the verifier identifier information $V_{ID}$ are mathematically combined before they are provided as input to the key derivation function.

In another embodiment, the verifier seed $S_V$ for a particular time period is derived from a seed specific to the verifier, the verifier master seed $S_{VM}$, that is, in turn, derived from the master seed $S_M$. In one such embodiment, the verifier master seed is derived by application of the key derivation function to the master seed $S_M$ and the verifier identifier $V_{ID}$. The verifier seed is derived by application of the key derivation function to the verifier master seed $S_{VM}$ and the time identifier $T_{ID}$.

Figure 2:
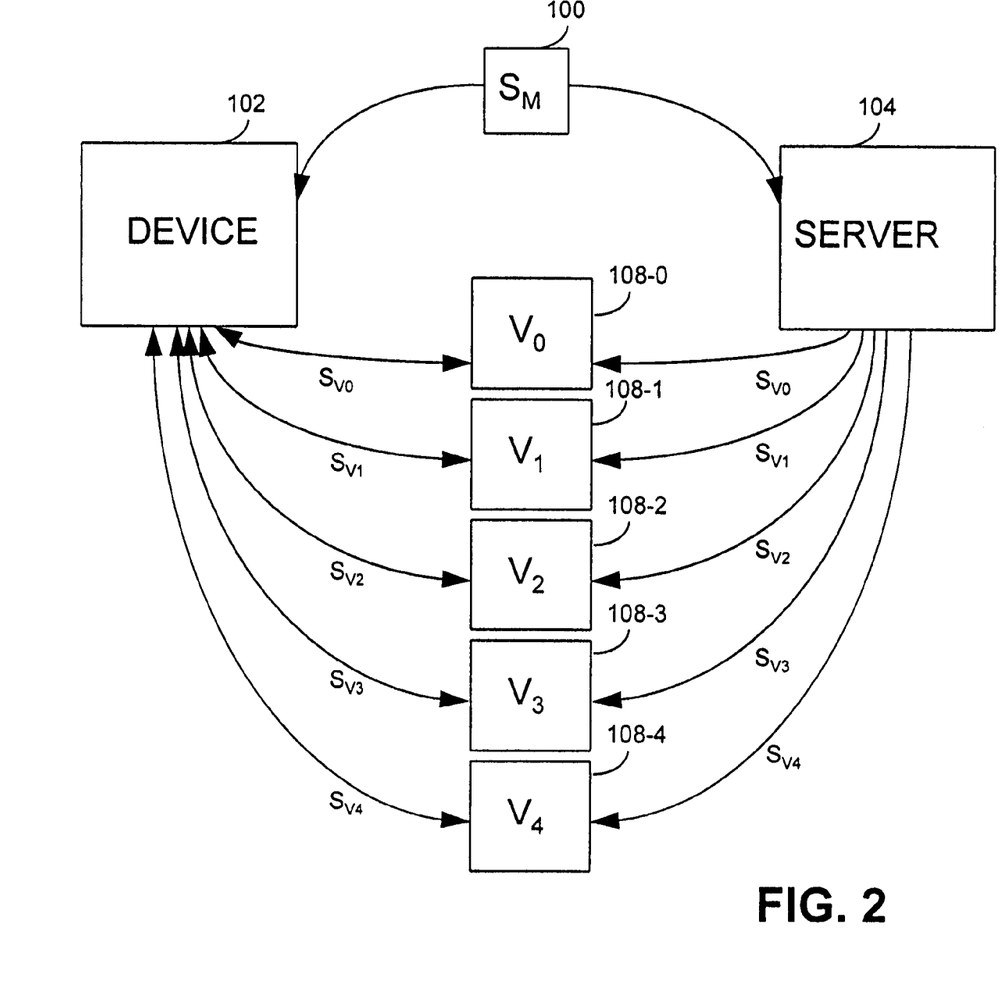
FIG. 2 is a block diagram of an embodiment of a system with multiple verifiers according to the invention.

Referring to FIG. 2, the embodiment of FIG. 1 is extended to multiple verifiers 108-0, 108-1, 108-2, 108-3, and 108-4, generally 108, each having a different verifier seed $S_{Vn}$. The device 102 and the server 104 share the secret master seed $S_M$ 100. The server 104 determines verifier seeds $S_{V0}$, $S_{V1}$, $S_{V2}$, $S_{V3}$, and $S_{V4}$, generally $S_{Vn}$, for each of the plurality of verifiers 108. The number of verifiers shown is illustrative, and is not intended to limit the invention to any particular number of verifiers. In one embodiment, the server 104 distributes the verifier seeds $S_{Vn}$ to each of the verifiers 108. The device 102 is used to authenticate with each of the verifiers 108 by using the appropriate verifier seed $S_{Vn}$ for that verifier.

Figure 3:
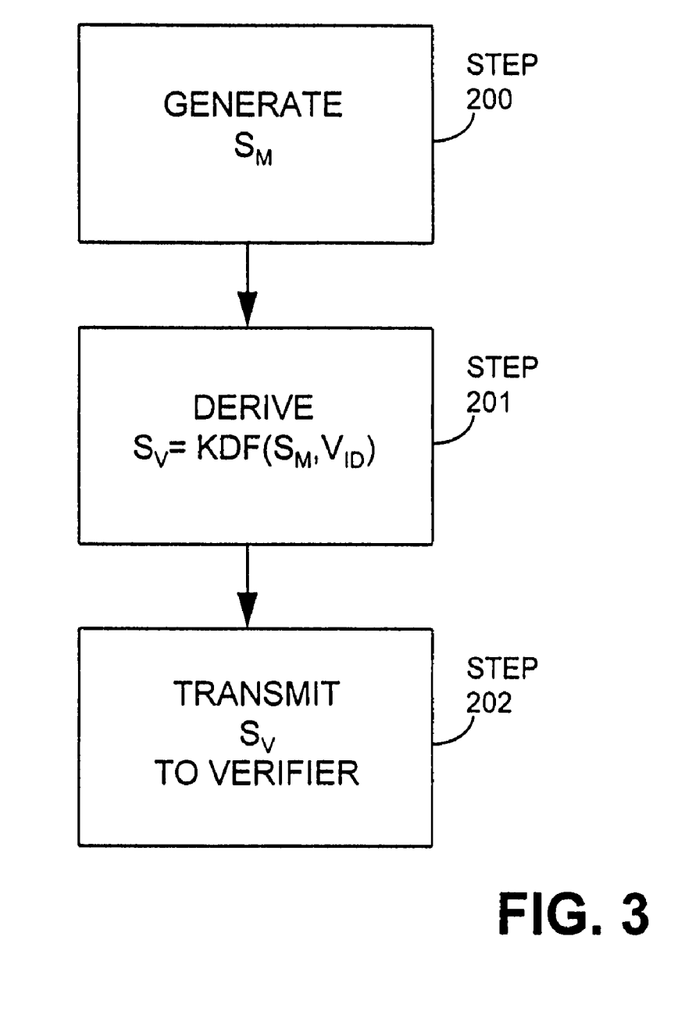
FIG. 3 is a flowchart of an embodiment of an authentication method according to the invention.

Referring to FIG. 3, a method for authenticating a user with a verifier includes generating a master seed $S_M$ (STEP 200). As described above, the seed may be generated by a seed generator incorporated into device 102 or server 104, or by a seed generator located elsewhere. In one embodiment, the master seed $S_M$ is unique for a particular device. In another embodiment, the master seed $S_M$ is unique for a group of devices. In one embodiment, the master seed $S_M$ is stored in a hardware or software token device accessible by a user.

The method includes deriving a verifier seed $S_V$ based on the master seed and verifier information (STEP 201). In one embodiment, the verifier seed $S_V$ is derived using a key derivation function that takes as inputs the user's master seed and the verifier identifier information. In one embodiment, the verifier seed $S_V$ is specific to a verifier or plurality of verifiers. In one embodiment, the key derivation function also receives other information as inputs, including, but not limited to, time identifier information. In one embodiment, this other information is mathematically combined with the verifier identifier before being provided to the key derivation function. The key derivation function provides, as an output, a verifier seed $S_V$ specific to the master seed and the verifier.

The method further includes transmitting the verifier seed $S_V$ to a verifier (STEP 202). Preferably, the transmission occurs over a secure channel. For example, in one embodiment, the verifier seed $S_V$ is transmitted to a verifier over an encrypted network connection. In another embodiment, the verifier seed $S_V$ is transmitted to a verifier by storing the seed on portable media such as a floppy disk, and carrying the disk to the verifier. In another embodiment, the verifier seed $S_V$ is transmitted to the verifier by entering the information directly into the verifier, by a keypad, keyboard, or other input. Once transmitted to the verifier, the secret shared by the verifier 108 and the device 102, the verifier seed $S_V$, can be used by the verifier for authentication, encryption, or communication.

Figure 4:
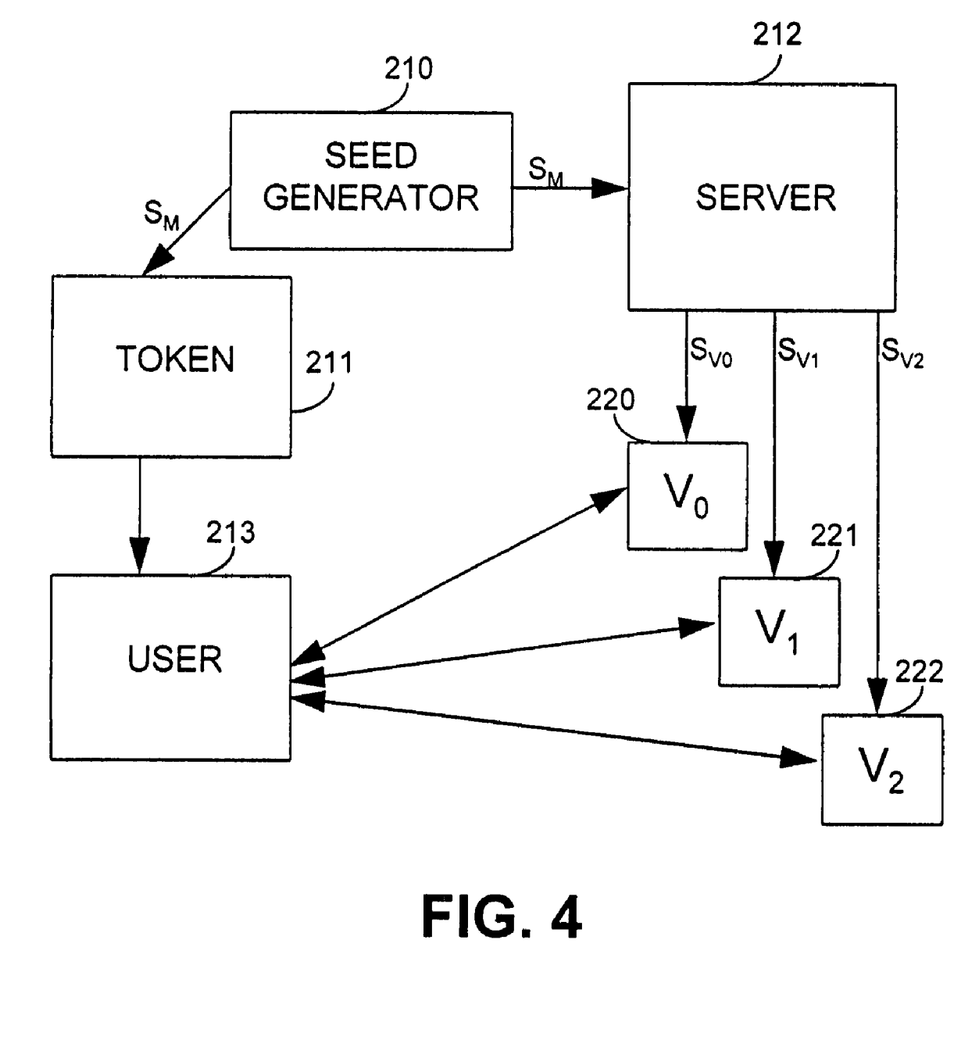
FIG. 4 is a block diagram of an embodiment of the invention using a token.

Referring to FIG. 4, an embodiment of such an authentication system is implemented with a token 211. In one such embodiment, the token 211 is a hardware token implemented as a credit-card sized device that incorporates a microprocessor with memory and associated hardware logic and firmware, a battery, an LCD display. In one embodiment, the token 211 also accepts data input, for example by buttons, a keypad, or a pressure-sensitive display. A master seed $S_M$ is generated for each hardware token 211 by a seed generator 210. The seed generator 210 is a random number generator configured to output random seeds. In one embodiment, the master seeds $S_M$ generated by the seed generator 210 are random numbers of 64 or 128 bit length.

In one embodiment, the memory of the hardware token 211 is programmed during manufacture with the master seed $S_M$ for that token 211, as well as with the current time, and also with verifier/and or time identifier information. In another embodiment, any or all of this information is entered into the memory of the hardware token electronically via a data communication path or by using specific input button sequences. The master seed $S_M$ for the token is also transmitted to a seed distribution server 212 via a secure channel. In one embodiment, the master seed $S_M$ is recorded on portable media, such as a floppy disk, by the seed generator 210, and the disk is carried to the seed distribution server 212. In another embodiment, the master seed $S_M$ is transmitted over a data network. In other embodiments, other transmission schemes are used to provide the server with the master seed $S_M$ associated with a particular token 211. Thus, the token 211 and the seed distribution server 212 share the secret of the master seed $S_M$.

The seed distribution server 212 generates verifier-specific seeds for the various verifiers 220-222. Three verifiers, $V_0$ 220, $V_1$ 221, and $V_2$ 222 are shown in the figure as an example of a plurality of verifiers, and not to limit the invention to any particular number of verifiers. Each verifier, $V_0$ 220, $V_1$ 221, $V_2$ 222, has associated with it a verifier identifier $V_{ID}$. The verifier identifier is an input to the key derivation function. Depending on the key derivation function chosen, it may be possible to use simple verifier identifiers, such as three-letter codes, as verifier identifiers. Alternatively, the verifier identifier may be a number that is long and complex. It makes sense, if the verifier identifier is a long and complex number, to provide a user with an easy-to-remember name or mnemonic for a verifier, such as a number or a short alphanumeric code. The name can be used to "look up" the actual verifier identifier from a preprogrammed table.

The verifier identifier $V_{ID}$ is used to derive verifier seeds $S_{V0}$, $S_{V1}$, and $S_{V2}$ for each verifier using a key derivation function. Each verifier seed $S_{Vn}$ is transmitted over a secure channel to the respective verifier, so that verifier seed $S_{V0}$ is transmitted to verifier $V_0$ 220, verifier seed $S_{V1}$ is transmitted to verifier $V_1$ 221, verifier seed $S_{V2}$ is transmitted to verifier $V_2$ 222, and so on. In one embodiment, the specific verifier seeds $S_{Vn}$ are recorded on portable media, such as a floppy disk, by the seed distribution server 212, and the disk is carried by hand and loaded onto the verifiers $V_n$. In another embodiment, the verifier specific seed $S_{Vn}$ is transmitted over an encrypted communications channel over a computer network to each verifier $V_n$. In other embodiments, other transmission schemes are used. The verifiers $V_n$ thus are provided with the verifier seed $S_{Vn}$ associated with a particular token 211.

In operation, a user 213 uses the token 211 to authenticate to a verifier 220-222. For clarity, the authentication process will be described with regard to verifier $V_1$ 221, but it should be understood that a similar process is used for other verifiers. The user 213 enters a verifier identifier $V_{ID}$, or a code associated with the verifier identifier $V_{ID}$, into the token 211. In one embodiment, this is accomplished using the token's input buttons. In one embodiment, the code is the first few letters of the name of the verifier $V_1$ 221. In another embodiment, the code is a 1-button indicator of the appropriate verifier, and in another embodiment, the code is an identifier number. In other embodiments, other techniques are used to specify the verifier $V_1$ 221. In one embodiment, the token 211 determines the verifier identifier from the code entered by the user 213. The verifier identifier may in fact be the code associated with the verifier 221 entered by the user, or the token 211 may otherwise derive the verifier identifier from the code entered by the user 213, for example by performing a hash or other mathematical operation, or by performing a lookup operation.

The token 211 uses the verifier identifier to determine the verifier seed $S_{Vn}$ for the verifier. The token 211 then uses the verifier seed $S_{Vn}$ to determine an authentication code that the user 213 can use to authenticate to the verifier 221. In one embodiment, the code output by the token 211 is the result of a mathematical operation, such as a cryptographic operation, performed on the verifier seed $S_{Vn}$. In another embodiment, in additional to the code associated with the verifier 221, the user 213 also enters a personal identification number (PIN) into the token 211. In this embodiment, the code output by the token 211 is the result of a mathematical operation, such as a cryptographic operation, performed on the verifier seed $S_{Vn}$ and the personal identification number entered by the user. In another embodiment, the code output by the token 211 is a result of a mathematical operation, such as a cryptographic operation, performed on the verifier seed $S_{Vn}$, the personal identification number entered by the user, and other information, for example a value derived from the current time.

The user reads the code that is output on the token's 211 display, and transmits the code to the verifier. This transmission may be accomplished in various ways, including, but not limited to, typing the code into a keypad or computer keyboard, writing or speaking the code, otherwise transmitting over a computer or telephone network and so on. The verifier 221 determines whether the code is appropriate, for example, whether it is, in the above embodiment, correctly derived from the verifier seed, the user's PIN, and the current time. If it was correctly derived, the user is authenticated, and access is granted. If the code is incorrect, other action may be taken, including, but not limited to, transmitting an alert signal, allowing the user to try again, etc.

To authenticate to another one of the verifiers, for example verifier $V_0$ 220, the user 213 enters the code associated with that verifier. The token 211 determines the verifier seed $S_{V0}$ for that verifier $V_0$ 220, and provides an authentication code appropriate for that verifier $V_0$ 220.

In another embodiment of the token 211, the token is capable of storing static passwords, as well as determining authentication codes based on a verifier seed. The user enters static passwords in the token, and associates the static password with a service identifier. When the user enters the service identifier into the token 211, the token 211 determines whether the service identifier indicates a static password that is stored in the token, or whether the service identifier indicates a verifier identifier. As described above, for dynamic authentication codes, the service identifier may be the verifier identifier or a reference to the verifier identifier. In one embodiment, the token also requires the user to enter a PIN or other code in order to obtain a stored static password. This embodiment allows the token to function as a multi-purpose password/authentication tool that stores a user's static passwords, and provides authentication codes based on various verifier seeds based on the user's master seed.

Figure 5:
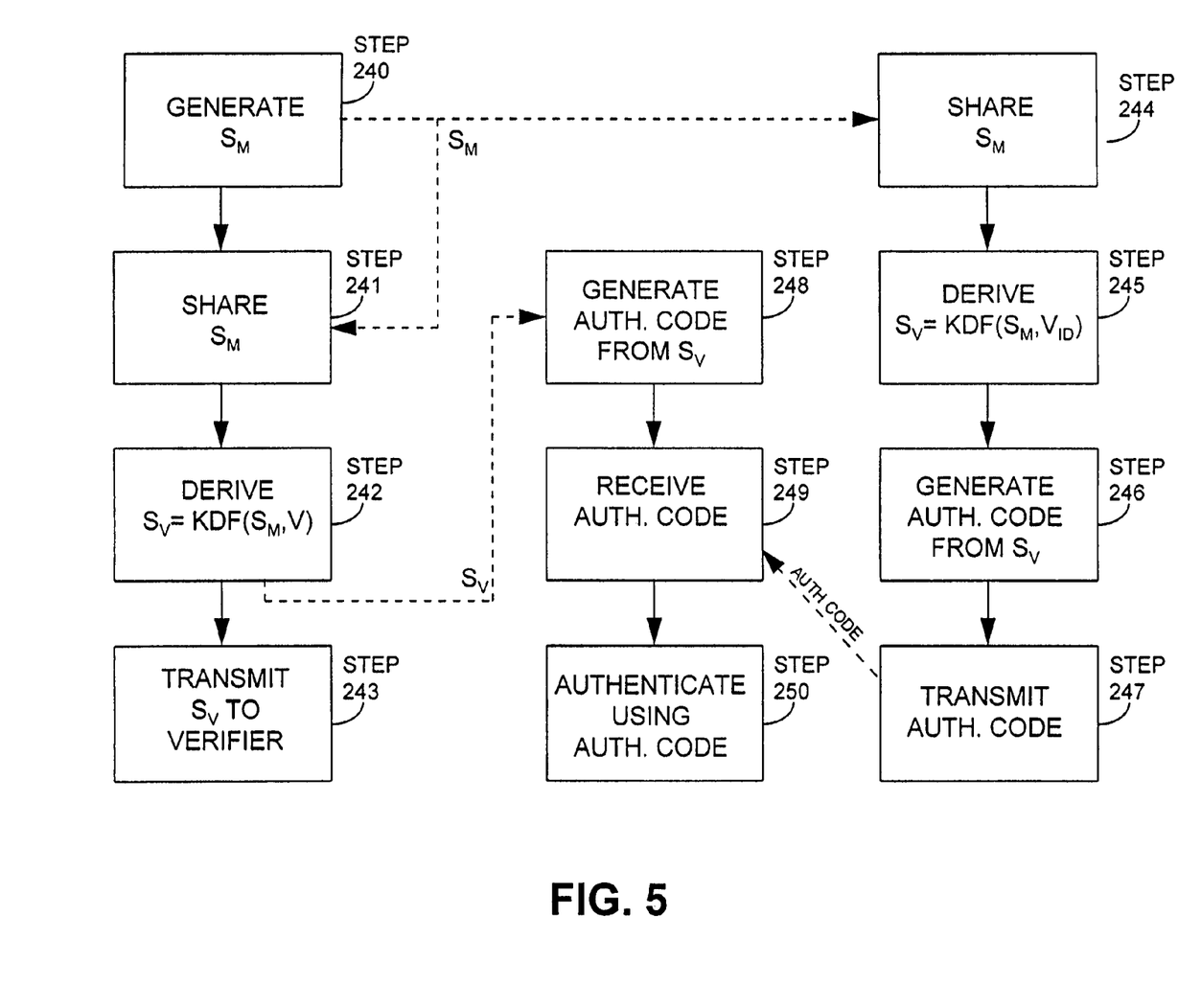
FIG. 5 is a flowchart of an authentication method according to the invention.

Referring to FIG. 5, a method for authentication includes generating the master seed $S_M$ (STEP 240). In one embodiment, a seed generator 210 generates the master seed $S_M$. In various embodiments, the seed generator 210 is incorporated into the server 212, the token, 211, or a separate device 210. The seed generator 210 outputs the master seed so that it can be stored in the token 211 and in the seed distribution server 212, thus sharing the master seed $S_M$ with the token 211 and the seed distribution server 212 (STEP 241, STEP 244). In one embodiment, the master seed $S_M$ is generated by the token 211, and displayed once on the LCD display to allow sharing with the seed distribution server 212. In yet another embodiment, the seed distribution server 212 generates the master seed $S_M$, and the master seed $S_M$ is programmed into the token 211. The seed distribution server 212 determines the verifier seeds $S_{Vn}$ for each of the verifiers, using the master seed $S_M$, a verifier identifier, and possibly other information as inputs (STEP 242). The seed distribution server 212 transmits the verifier seeds $S_{Vn}$ to the verifiers 220-222 (STEP 243).

In one embodiment, once the master seed $S_M$ has been shared, the token 211 stores the master seed $S_M$ in its memory (STEP 244). To authenticate with a verifier, the token 211 derives the seed appropriate for that verifier (STEP 245) using the master seed $S_M$, a verifier identifier, and possibly other information as inputs. The token 211 generates an authentication code based on the verifier seed $S_V$ and possibly other information (STEP 246). In one embodiment, the authentication code is based on additional information such as a PIN, the current time, and so on. In such an embodiment, the authentication code is only useful for a short time period. The authentication code is transmitted to the verifier (STEP 247). In one embodiment, a user 213 reads the authentication code from the token 211 display, and transmits the authentication code to the verifier.

The verifier 221 receives the verifier seed $S_V$ from the server, and stores the verifier seed $S_V$. When the token attempts to verify with the verifier, the verifier determines an authentication code (STEP 248) from the verifier seed $S_V$. The authentication code is also determined by the additional information such as a PIN, the current time, and so on if that information is used by the token 211 to determine the authentication code. The verifier receives the authentication code (STEP 249) and authenticates the entity (STEP 250) by comparing the transmitted authentication code with the authentication code determined in STEP 247.

Variations, modifications, and other implementations of what is described herein will occur to those of ordinary skill in the art without departing from the spirit and the scope of the invention as claimed.

For example, an implementation can break the seed derivation into two or more steps without departing from the scope of the invention. In one such embodiment, a temporary intermediate seed is derived from the master seed by mathematically combining the master seed with a time identifier. Verifier seeds are generated from the temporary intermediate seed and distributed periodically to the verifiers. This approach further restricts the scope of a potential compromise of either the temporary intermediate seed or the verifier seeds, because all such verifier seeds are considered "expired" at the end of a preselected time duration. In one such embodiment, the temporary intermediate seed is derived from the master seed using a date identifier. Verifier seeds are generated daily from the temporary intermediate seed using the appropriate verifier identifiers. A server distributes these verifier seeds to the verifiers. A user's device generates the temporary intermediate seed each day using the time identifier, and then uses the temporary intermediate seed to derive verifier seeds for each verifier, using verifier information.

Also, the invention can be used to have a single secret (the master seed) provide authentication within and outside of an enterprise. Within an enterprise, the enterprise issues a token to each user containing the master seed, and distribute verifier seeds to various services within an enterprise. These services can each authenticate users using the shared secret, and/or authentication codes derived from the shared secret. This compartmentalizes any compromise to a particular service. Outside of a single enterprise, the invention also allows for use of a single secret to enable authentication with a variety of unrelated services. Each of the unrelated services receive a verifier seed from the server that has the master seed. A user can then authenticate with each of the unrelated services separately, without the need for any prior communication between the user and each of the services. The user need only know the appropriate verifier identifier for the service.

In addition, an authentication code based on a verifier seed, as described above, can be used as an encryption key for secure communications between a user and a server that has a verifier seed for that user. The secure channel can be used for continued communications, or to securely communicate another encryption key for secure communications.

Accordingly, the invention is to be defined not by the preceding illustrative description but instead by the spirit and scope of the following claims.

What is claimed is:

1. A method for distributing seed information associated with a device, said method comprising:
   generating a master seed associated with the device;
   deriving a derived seed from the master seed and information associated with a security system; and
   sharing with the security system a value that is derived from the derived seed, wherein the security system cannot access the master seed.

2. The method of claim 1, further comprising sharing the master seed with the device.

3. The method of claim 2, wherein sharing with the device said information associated with the security system includes entering said information associated with the security system into the device through a key pad.

4. The method of claim 2, further comprising in the device deriving the derived seed.

5. The method of claim 2, further comprising storing a static password in the device and using the static password along with the derived seed to perform authentication with the security system.

6. The method of claim 2, further comprising sharing with the device the information associated with the security system.

7. The method of claim 6, wherein sharing with the device said information associated with the security system includes programming said information associated with the security system into the device.

8. The method of claim 6, wherein sharing with the device said information associated with the security system includes entering said information associated with the security system into the device electronically.

9. The method of claim 6, wherein sharing with the device said information associated with the security system includes entering said information associated with the security system into the device through a key pad.

10. The method of claim 1, further comprising sharing the master seed with the device and a server.

11. The method of claim 1, further comprising:
deriving a second derived seed using the master seed and information associated with a second security system; and
sharing the second derived seed with the second security system.

12. The method of claim 1, further comprising, at the security system, generating an authentication code in response to deriving the derived seed.

13. The method of claim 12, wherein authentication code generating includes generating the authentication code from the derived seed and a time dependent value.

14. The method of claim 12, further comprising authenticating using the authentication code.

15. The method of claim 14, wherein authenticating comprises authenticating a user or a device by verifying the authentication code.

16. The method of claim 15 wherein authenticating further comprises transmitting the authentication code to the security system.

17. The method of claim 12, wherein authentication code generating includes sending a challenge value to the device and receiving from the device a response which is the challenge encrypted by using the derived seed.

18. The method of claim 1 wherein master seed generating comprises at least one of randomly generating and pseudo-randomly generating the master seed.

19. The method of claim 1 wherein deriving comprises deriving the derived seed from a time identifier.

20. The method of claim 1, wherein deriving comprises deriving the derived seed by using the master seed and information associated with a verifier as inputs to a key derivation function.

21. The method of claim 20, wherein the key derivation function comprises a hash function.

22. The method of claim 1, further comprising generating an encryption key from the derived seed.

23. The method of claim 1, further comprising using the derived seed for encryption.

24. The method of claim 1, wherein generating the master seed is performed by the device.

25. The method of claim 1, further comprising:
deriving a plurality of different derived seeds using the master seed and information associated with a plurality of security systems; and
sharing the plurality of derived seeds with the plurality security systems, wherein the first-mentioned security system is one of the plurality of security systems and the first-mentioned derived seed is one of the plurality of derived seeds.

26. The method of claim 1, wherein sharing said value with the security system includes typing the value into a keypad associated with the security system.

27. The method of claim 1, wherein sharing said value with the security system includes transmitting over a network.

28. The method of claim 1, wherein deriving the derived seed includes first deriving an intermediate seed from the master seed and a time identifier and then deriving the derived seed from the intermediate seed and said information associated with the security system.

29. A method of authenticating a device to a security system based on a master seed associated with the device, said method comprising:
deriving a derived seed using the master seed and information associated with the security system;
isolating the master seed from the security system such that the security system cannot access the master seed;
in the security system. generating an authentication code based at least in part on the derived seed;
using the authentication code to authenticate the device; and
storing a static password in the device and using the static password along with the derived seed to perform authentication with the security system.

30. A method comprising:
at a user device, calculating a verifier seed by applying a cryptographic function to a master seed and to a verifier identifier, the master seed being uniquely associated with the user device, the verifier identifier being associated with a security system;
at a host server, the host server storing the master seed associated with the user device and the verifier identifier associated with the security system, calculating the verifier seed by applying the cryptographic function to the master seed and to the verifier identifier;
transmitting the calculated verifier seed from the host server to the security system by a secure mechanism, the security system having no access to the master seed;
transmitting an authentication message from the user device to the security system; and
at the security system, authenticating, based on the received authentication message and the received calculated verifier seed, that the user device is in possession of the verifier seed.

31. A method as in claim 30 wherein the method further comprises:
generating the master seed associated with the user device with one of a random number generator and a pseudo-random number generator;
sharing the generated master seed with the user device and the host server; and
persistently storing the shared master seed in user device and in the host server.

32. A method as in claim 31 wherein generating the master seed is performed by the user device.

33. A method as in claim 30 wherein:
the security system is one security system of a plurality of security systems; and
the verifier identifier is uniquely associated with the security system of the plurality of security systems.

34. A method as in claim 30 wherein calculating the verifier seed, at both the user device and the security system, further includes applying the cryptographic function to a time identifier.

35. A method as in claim 30 wherein transmitting the calculated verifier seed from the host server to the security system by the secure mechanism includes transmitting across a secure channel.

36. A method as in claim 30 wherein transmitting the calculated verifier seed from the host server to the security system by the secure mechanism includes transmitting across a computer network with encryption.

37. A method as in claim 30 wherein transmitting the authentication message from the user device to the security system includes sending the verifier seed from the user device to the security system.

38. A method as in claim 30 wherein transmitting the authentication message from the user device to the security system includes:
   at the user device, calculating an authentication code by encrypting a piece of data with the verifier seed as encryption key; and
   transmitting the authentication code from the user device to the security system.

39. A method as in claim 38 wherein:
   calculating the authentication code by encrypting a piece of data with the verifier seed as encryption key includes encrypting a personal identification code with the verifier seed; and
   authenticating, based on the received authentication message and the received calculated verifier seed, that the user device is in possession of the verifier seed includes decrypting the received authentication message with the calculated verifier seed and verifying that the decrypted authentication message encodes a valid personal identification code.

40. A method as in claim 39 wherein the method further comprises, at the user device, receiving the personal identification code through user entry at substantially the same time that a user seeks access to the security system.

41. A method as in claim 39 wherein encrypting the personal identification code with the verifier seed includes retrieving the personal identification code from persistent storage within the user device.

42. A method as in claim 38 wherein:
   calculating the authentication code by encrypting a piece of data with the verifier seed as encryption key includes encrypting a time identifier with the verifier seed; and
   authenticating, based on the received authentication message and the received calculated verifier seed, that the user device is in possession of the verifier seed includes decrypting the received authentication message with the calculated verifier seed and verifying that the decrypted authentication message encodes a time identifier indicating that the authentication code was generated within a specified time period prior to the decryption.

* * * * *